UNITED STATES PATENT OFFICE 2,569,758

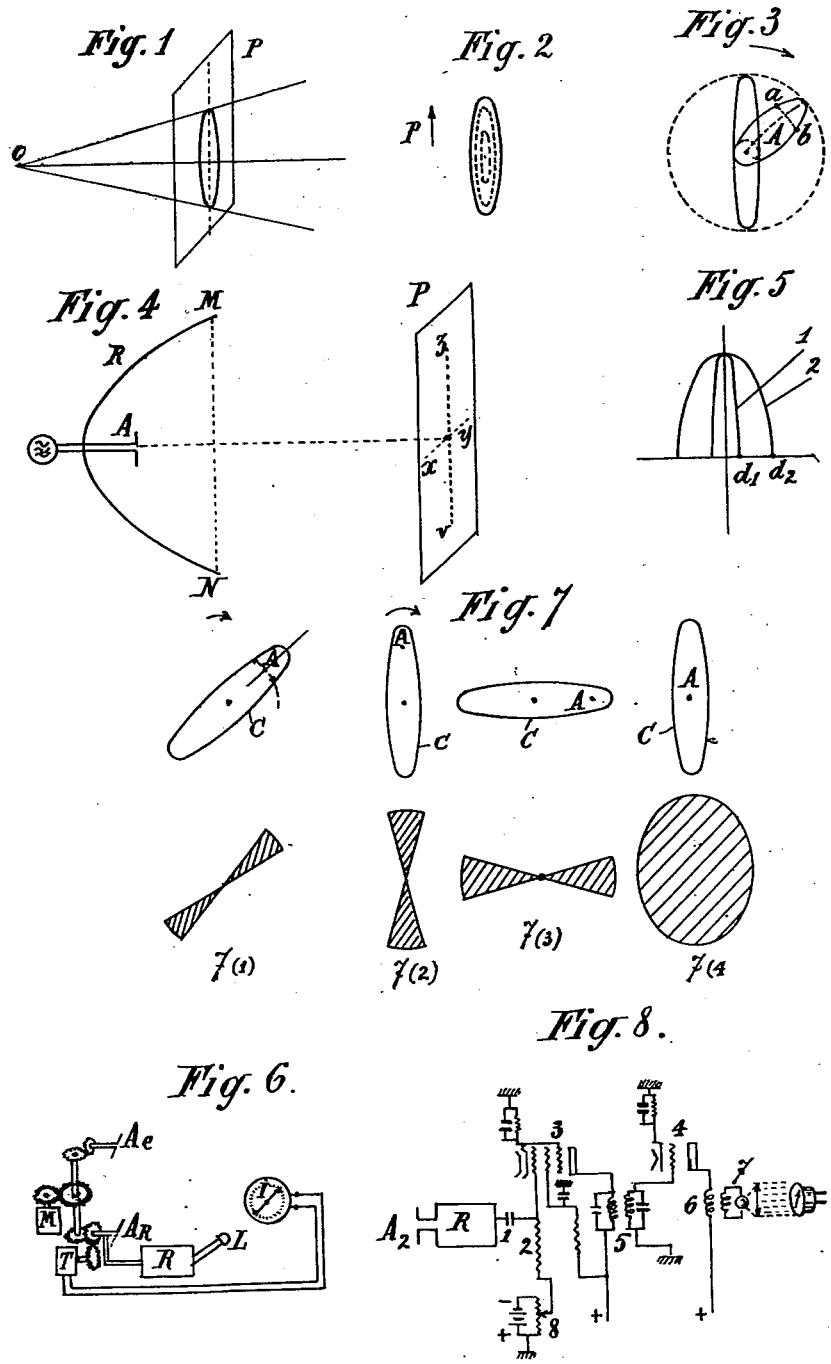

RADAR SYSTEM

Henri Gutton and Maurice Ponte, Paris, France, assignors to Compagnie Generale de Telegraphie Sans Fil, a corporation of France Application April 30, 1947, Serial No. 744,844
In France December 6, 1939

Section 1, Public Law 690, August 8, 1946
Patent expires December 6, 1959

3 Claims. (Cl. 343—11)

This invention relates to radar systems that is, to systems for detecting obstacles or targets such for example as aircraft by reflection of electro-magnetic waves.

Ultra-short waves, such as centimetre waves, are particularly suitable for radar or radio detection systems. The advantages of these waves over longer waves such as waves of the order of a metre or even of a decimetre, lie in the facility with which they may be concentrated into beams like light waves, by projectors. The position in space of a target can then be ascertained by noting the elevation and azimuth of the radio mirror or other projector and measuring the echo time from the target that is, by ranging on it. The use of very short waves removes to a large extent difficulties arising from reflection from the ground near the projector since, with such waves a projector will give excellent beam concentration without having to be of the large, almost prohibitive dimensions which would be required with the waves of the order of a metre in length.

On the other hand the "spread" of an ultra short wave projector is comparatively small, being normally only a few degrees, and unless special provision is made to search a large volume for a target such as an aircraft and then pick it up and follow it, this is a difficult and delicate matter especially if it is necessary to search quickly.

This invention seeks to circumvent these difficulties and to provide means enabling a radar projector to be easily trained on a taregt even by other than a highly skilled operator.

The invention which is illustrated in and explained in connection with the accompanying drawings consists essentially in utilizing a radio beam which is not, as hitherto of circular cross-section but which is very narrow in one direction and much wider in the perpendicular direction, that is, it is approximately ribbon shaped.

In the drawings:

Fig. 1 is a schematic perspective view of the radiating beam used in the system of our invention; Fig. 2 is a transverse sectional view taken through the plane P of the beam of Fig. 1; Fig. 3 is a diagrammatic view of the transmitter diagram produced by revolving the radio beam of Fig. 1 around its mean axis; Fig. 4 shows the system of our invention employing a dipole associated with a parabolic reflector; Fig. 5 is a characteristic transmitter curve of the system of Fig. 4; Fig. 6 diagrammatically shows a typical transmitting and receiving system for carrying out our invention; Fig. 7 shows a series of views illustrating the visual appearance of the receiver indicator for corresponding positions of the revolving beam C and the target A; and Fig. 8 is a diagrammatic view of the portion of the receiver which illuminates the indicator. Figs. 1 and 2 represent a beam employed in the system of our invention with reference to a plane P perpendicular to its axis. In Fig. 2 which shows the section of the beam passing through the plane P, the enclosing line of zero held strength is shown in full lines. Curves of equal field strengths being represented by dotted lines. For the sake of simplicity in explanation the simplest embodiment of the invention namely that in which the polarization of the field has the same direction (or nearly the same) everywhere in the beam will be assumed. For example the direction of polarization at all points in the beam may be assumed to be parallel to the longer dimension of the beam, that is, parallel to the arrow P in Fig. 2. This is not a necessary condition but its assumption simplifies understanding of the invention.

Suppose now that the beam is caused to revolve around its mean axis without altering its shape, the receiver diagram being similarly synchronously rotated so that the axes of the transmitter and receiver diagrams remain always parallel, or nearly so. The transmitted diagram, shown in Fig. 3 only by its zero field line is revolved for instance in the direction of the arrow. Then the space swept by the major axis of the beam in a transverse plane will be as indicated by the dotted line circle. It is of course to be understood that the receiver diagram revolves in the same way, with the same polarization, and in the same plane.

If an obstacle is situated at A, it will give an echo during the time taken by the major axis to pass from $a$ to $b$. The echo will be received for the same period. If, therefore the receiver incorporates means for localizing in time the moment of reception, warning will be given of the presence of a target in the field of the apparatus, and the axis of rotation can be then trained on the target. Correct training on the target will be indicated by the fact that then the reception will be unchanged as the beam rotates.

The following is a simple embodiment of the invention given by way of example only. First, referring to Fig. 4 the transmitted beam is formed as follows. A circular parabolic mirror R is employed with an aerial A at its focus. If, as illustrated the aerial is a dipole or other aerial which is not circularly symmetrical there will be a dissymmetry since the reflector is circularly symmetrical. For example if the focal length of the mirror is 36 cms. and its aperture (MN) is three metres, and the aerial is a dipole each wire of which is four centimetres long, the diagram of the system for a wavelength of sixteen centimetres, will have the following characteristics. Consider a plane P perpendicular to the axis and sufficiently removed from the mirror, and observe a line $xy$ perpendicular to the axis and to the length of the dipole. In the direction of this line the mirror is fully efficient and the beam is highly concentrated and if distance along $xy$ from its mid point is plotted as abscissae against field strength as ordinates, a curve 1 as shown in Fig. 5 is obtained, that is, in this direction the beam is highly concentrated. For the particular case mentioned, zero field strength is obtained at an angle of little more than two degrees from the axis.

In the direction $vz$ however perpendicular to $xy$, that is to say, parallel to the length of the dipole, the mirror is not so efficient, since the aerial does not radiate in its own direction. The corresponding diagram is wider and the curve 2 of Fig. 2 represents for the direction $zv$ the same factors as the curve 1 for direction $xy$. The zero field line occurs, for the example given at 7° 30' to the axis.

For directions in the plane P different from $xy$ and $zv$, the results are intermediate between curves 1 and 2. It will be observed that the electric polarization is always parallel to A.

The receiver diagram is obtained in the same way by the same or a similar aerial-reflector combination.

The rotation of the diagram is obtained by causing the transmitter and receiver aerials (if separate aerials are employed) to rotate simultaneously in their mirrors so that they remain constantly parallel, for example, by mounting them on the same shaft. Since the aerials are very small, the rotating parts have only very little inertia and can be rotated with sufficient speed for the method of searching later to be described to be very efficient.

Referring now to Fig. 6 the transmitting and receiving aerials Ae AR are rotated by a motor which also revolves a pointer I by one revolution for every revolution of the aerials the pointer being vertical when the aerials are vertical. The diagram of Fig. 6 shows the two serials Ae and AR driven by the motor M through suitable gearing, a telemotor or repeater transmitter T also being driven and supplying energy to its repeating receiver driving the pointer I. It will be seen that the pointer I can be made to revolve with the aerials in synchronism therewith.

The receiver proper R fed by the aerial AR flashes a lamp L with the received echo signals after the normal radio frequency amplification, detection and low frequency amplification if necessary. The lamp L is a neon tube or other instantaneously responding lamp and is arranged alone to illuminate the pointer I and its dial in a conspicuous manner. A white pointer for instance, may be used on a black background, and the lamp L provided with a suitable optical system.

It will be appreciated that the pointer will only be visible when the revolving beam encounters a target. If the aerials, and consequently the pointer are revolved at such speed that the luminous impression produced is continuous, by persistence of vision, an observer will see, when a target is encountered a luminous sector, the width and position of which sufficiently indicates the position of the target for the axis of the projector to be quickly trained upon it. The speed of rotation of the aerials may for instance, be 50 revs. per second, which is a convenient speed in most cases.

Fig. 7 shows in hatched areas the various appearances presented by illumination of the pointer. In each case the revolving beam is represented by an enclosing line C and the target by a point A and the appearance of the corresponding illumination is represented below each diagram. At 7 (1) the target is well off the axis and the projector is not trained either in azimuth or elevation; at 7 (2) the projector is trained in azimuth as also is the case at 7 (3); at 7 (4) the target has been brought on the axis. An operator can easily train the projector to bring it on the target by altering it in such a way as always to increase the illuminated area.

The accuracy may be made of a very high order by controlling the sensitivity of the receiver and preferably the sensitivity of the part of the receiver which controls illumination of the tube. When the projectors have been trained carefully the sensitivity is progressively reduced to reduce the area in which the target creates continuous illumination of the pointer.

Fig. 8 is a diagram of the part of the receiver which illuminates the needle. Transmission is effected in short impulses, at a repetition frequency of for instance, 6,000 per second. These impulses after reflection from a target are received by a revolving aerial A2, connected to a receiver R, and supplying impulses at a frequency of 6,000 per second via the resistance capacity coupling network 1, 2 to the grid of a tube 3. In the plate circuit of this tube is a resonant filter 5 of high Q value tuned to 6,000 cycles. This filter feeds the tube 4, which, through the transformer 6, brings about the illumination of the lamp 7 during the reception. The adjustable bias arrangement 8 enables the sensitivity of the system to be regulated to increase the accuracy as described.

It will be observed that the system can differentiate between several targets situated in the field and can be made to follow one of them only.

The invention, therefore, provides a means for searching quickly for a target without reducing sensitivity and without interfering with the accuracy of the measurements which determine target position. It uses apparatus which is easy to operate and does not require a high degree of skill.

Other means may be employed to obtain the required diagrams without departing from the scope of the invention. For example rotating reflectors or means for rotating the direction of polarization only could be used and we desire that it be understood that no limitations upon our invention are intended other than may be imposed by the scope of the appended claims.

What we claim is:

1. In an apparatus for the radio location of an obstacle, in combination, a transmitter comprising directive means for producing a conical searching radio beam, the cross section perpendicular to the axis of which presents a shape of a flat ellipse, means for making the beam turn around its axis so that the said flattened cross section scan a circular surface, a receiver including directive means for receiving the echo pulses from said obstacle, said last mentioned directive means having substantially the same radiating diagram as directive means at said transmitter and having an axis of propagation substantially parallel to the axis of the searching radio beam, driving means at said receiver for driving the directive means associated therewith around its axis in synchronism with the searching beam, transforming means connected to said receiver for transforming the echo pulses into luminous signals and rotating means synchronized with said driving means, associated with said transforming means for distributing said luminous signals along a circular path for visually determining the bearing of said obstacle with respect to said beam axis.

2. In an apparatus for the radio location of an obstacle using a searching beam and an echo reflected by the obstacle, in combination, transmitting and receiving direction aerials comprising each a reflector having the form of a paraboloid of revolution and a dipole-antenna located therein substantially in the focus of said paraboloid perpendicularly to the axis of the latter, the axis of both paraboloids being parallel and the two dipoles being parallel to each other, mechanical means for driving the two dipoles in synchronism around the axes of their reflectors, means connected to the receiving dipoles for producing a luminous signal during the reception of the echo signal and means synchronized with the rotation of the dipoles for indicating the angular position of the dipoles around said axis during said reception of the echo signals.

3. An apparatus for the electromagnetic detection of an obstacle by using a searching radio beam and the reflected echo pulses comprising in combination, directive emitting means for emitting a conical radiating searching beam of short impulses of ultra-short herzian waves for reflection by an obstacle, said beam presenting a cross section perpendicular to its axis of an elongated shape such as a flat ellipse, directive receiving means for receiving the echo pulses from the obstacle having substantially the same radiation diagram as that of the emitting means, the axis and the shapes of said both diagrams being substantially parallel, driving means for making the both diagrams turn in synchronism, each around its axis, so that their cross sections scan a surface circular in cross section, whereby during each revolution a plurality of said impulses are emitted, means connected to the receiving means and synchronized with said driving means for producing during the reception of echo pulses a luminous mark on a circular indicator, the length of said mark being correlated with the time interval during which the searching beam scans the obstacle and the angular position of said mark on said indicator indicates the angular position of the obstacle around the axis of the searching beam.

HENRI GUTTON.
MAURICE PONTE.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,083,242 | Runge | June 8, 1937 |
| 2,231,929 | Lyman | Feb. 18, 1941 |
| 2,415,095 | Varian | Feb. 4, 1947 |
| 2,421,028 | King | May 27, 1947 |
| 2,422,361 | Miller | June 17, 1947 |
| 2,426,182 | De Lange | Aug. 26, 1947 |
| 2,428,793 | Fay | Oct. 14, 1947 |
| 2,472,212 | Hudspeth | June 7, 1949 |

FOREIGN PATENTS

| Number | Country | Date |
|---|---|---|
| 317,826 | Great Britain | May 29, 1930 |